United States Patent Office 2,806,496
Patented Sept. 17, 1957

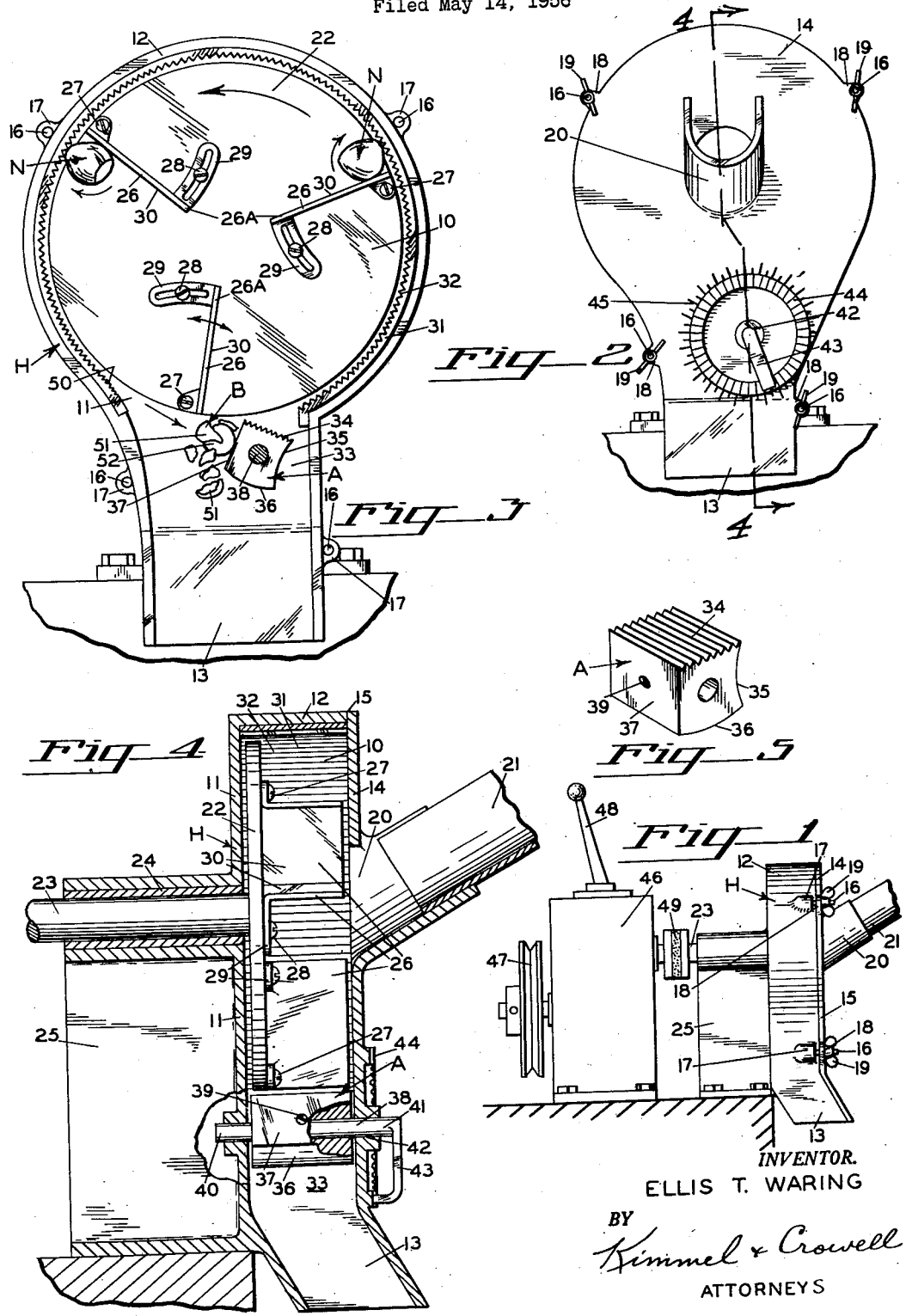

2,806,496

CENTRIFUGAL NUT CRACKER HAVING STATIONARY ANVIL

Ellis T. Waring, Woodburn, Oreg.

Application May 14, 1956, Serial No. 584,807

1 Claim. (Cl. 146—9)

The present invention relates to nut crackers, and more particularly to such devices which are adapted to the cracking of nuts on a commercial scale.

The primary object of the invention is to propel a nut in such a way that it is spinning while in flight and is suddenly brought against an anvil, breaking the shell of the nut from about the meat of the nut with a minimum of damage to the meat of the nut. By rotating the nut at a high rate of speed about its axis while moving through space, and suddenly causing it to strike an anvil, the shell of the nut is caused to explode outwardly severing itself completely from the meat within the shell, while the meat of the nut tends to keep on revolving tearing itself away from the inner connections between itself and the shell.

Another object of this invention is to provide a nut cracker which will maintain the shells in relatively large pieces while broken away from the meat of the nut, making it considerably easier to sort the shells from the meat.

A still further object of the invention is to provide a nut cracker which will maintain the meat in relatively large pieces with a minimum of damage.

Other objects and advantages will become apparent in the following specification when considered in the light of the attached drawings, in which:

Figure 1 is a side elevation of my new and improved nut cracker.

Figure 2 is a front elevation of the invention, shown partly broken away.

Figure 3 is an end elevation of the nut cracker with the end cover removed, shown partially in section.

Figure 4 is a longitudinal sectional view taken along the line 4—4 of Figure 2, looking in the direction of the arrows.

Figure 5 is a perspective detail view of the cracking anvil.

Referring now to the drawings in detail wherein like reference numerals indicate like parts throughout the several figures, the reference character H indicates generally a housing for the invention including rotor chamber 10, having a back wall 11 with an annular flange 12 forming part thereof and extending forwardly of the wall 11.

Formed on the lower side of the chamber 10 is a delivery chute 13. A cover plate 14 is adapted to engage the face surface of the flange 12, as at 15, and is maintained thereagainst by bolts 16, which are tapped into bosses 17 formed on the flange 12. Ears 18 form part of the cover plate 14 and are adapted to embrace or engage the bolts 16, after which wing nuts 19 are tightened down against the flanges 12.

An intake spout 20 forms part of the cover plate 14 and is adapted to receive a chute 21 for delivering nuts N into the chamber 10. Rotatably journalled within the chamber 10 is a rotor disk 22, which is formed integral with a shaft 23, the shaft 23 is journalled within bearing 24 forming part of a framework 25 of the machine.

Removably mounted to the face of the disk 22 are adjustable blades 26. The blades 26 are secured to the face of the disk 22 by screws 27 and 28. The radial angle of the blades 26 can be adjusted by slotted bracket 29 forming part of the blade 26 and being locked to the face of the disk 22 by the screws 28. Various types of striking faces 30 may be formed on the blades 26, as for instance they might be smooth as illustrated, or they may be corrugated or otherwise defaced.

A removable lining 31 may have various surfaces, as for instance the corrugated surface 32 as illustrated in the drawings, or the lining 31 may be smooth, or it could be of a resilient material, the object and purpose of which will be later more fully understood.

An anvil A is mounted within the throat 33 of the chute 13. This anvil A, referring particularly to Figure 5, may have a corrugated surface 34, a concave face 35, a convex surface 36, or it may be flat as shown at 37, or have other types of surfaces as may be required. This anvil A is fixedly mounted to a shaft 38 by a cross screw 39. The end 40 of the shaft 38 extends through and is journalled in the back wall 11 of the housing H and at its forward end 41 extends through and is journalled in the face plate 14 at 42.

A crank 43 is formed on the end 41 of the shaft 38 and is adapted to register with the quadrant 44. The operator knows by observing the quadrant 44 and its scale marks 45 as to the position of the anvil A within the throat of the machine.

In Figure 1, I illustrate a conventional type of speed changing gear box 46 for governing the speed of the machine from the driven pulley 47. Any type of gear reduction assembly could be used and this gear assembly may be varied to various speeds by the control 48. The shaft 23 is connected to the gear box 46 by a coupler 49.

Referring particularly to Figure 3, the nuts being cracked are illustrated at N and are travelling in a circle within the chamber 10, while the nut indicated by the letter B indicates a nut being broken against the anvil A.

The mode of operation of the machine will now be described. The operator enters the nuts N by way of the chute 21 into the intake spout 20 where they enter between the inner ends 26A of the blades 26. The disk 22 and the blades 26 are rotated in the direction of the arrow at a relatively high rate of speed, and as the nuts N enter between the inner ends of the blades 26 centrifugal force will cause them to travel towards the inner face 32 of the lining 31.

As the nuts N are moved over the corrugated surface 32 of the lining 31 by the rotation of the blades 26, they will be given rotation within themselves about their own axis, developing a relatively high rate of rotation as they travel around against the inner surface of the lining 31. They will be discharged from the lining 31 in the direction of the arrow at the point 50, towards and against the face 37 of the anvil A breaking the shell 51 away from the meat 52, and due to the fact that the nut N is rotating about an axis at a high rate of speed, it will tend to crack the shell 51 clear of the meat 52 and it will tend to prevent the shell 51 and the meat 52 from being broken into small pieces, making a clean separation between the two.

While I have shown the nuts N striking the smooth surface on the anvil A, it could be striking any of the other surfaces 34, 35 or 36, which under certain conditions gives a most desirable result, therefore the anvil A is made adjustable from the outside of the machine by moving the handle 43 over the quadrant 44 and the scale 45. The faces 30 of the blades 26 can be angularly adjusted as desired by loosening the screws 28. The faces 30 could be corrugated or be of a resilient material depending upon the results desired to be obtained.

It has been found that variation of speed of rotation of the disk 22 has an effect on the operation of the machine, therefore means are provided to change the rate of rotation, as best illustrated in Figure 1, by the speed changer 46.

Having thus described the preferred embodiment of the invention, it should be understood that numerous structural modifications and adaptations may be resorted to without departing from the scope of the appended claim.

What is claimed is:

A nut cracker comprising a housing, a semi-cylindrical annular liner mounted in said housing, a disk journaled in said housing concentrically with said liner, a plurality of blades, means pivotally securing the outer end of each of said blades to one face of said disk adjacent the outer edge thereof in equispaced relation thereabout with the axes of the blade pivoting means extending parallel to the axis of said disk, means adjustably securing the inner ends of said blades to said disk with said blades extending perpendicularly to the face of said disk, an anvil in said housing adjacent said disk, means on said housing for feeding nuts into said housing centrally of said disk, and means connected to said disk for revolving said disk relative to said liner, whereby nuts fed from said feeding means are engaged and rotated by said blades about the axis of said disks and are centrifugally engaged with said liner with said blade and said liner coacting to rotate said nuts about their own axis whereby said nuts will be thrown against said anvil while rapidly rotating about their own axis, said liner being provided with a roughened inner surface for contacting said nuts.

References Cited in the file of this patent
UNITED STATES PATENTS

| | | |
|---|---|---|
| 1,267,110 | Parsons et al. | May 21, 1918 |
| 2,378,393 | Carter | June 19, 1945 |
| 2,512,523 | Fisher et al. | June 20, 1950 |
| 2,573,129 | Dulait | Oct. 30, 1951 |
| 2,707,594 | Moore | May 3, 1955 |

FOREIGN PATENTS

| | | |
|---|---|---|
| 509,866 | Germany | Oct. 13, 1930 |
| 510,850 | Germany | Jan. 10, 1933 |